C. P. SALGEE.
ANTISKID TIRE.
APPLICATION FILED DEC. 11, 1920.
1,385,926.
Patented July 26, 1921.
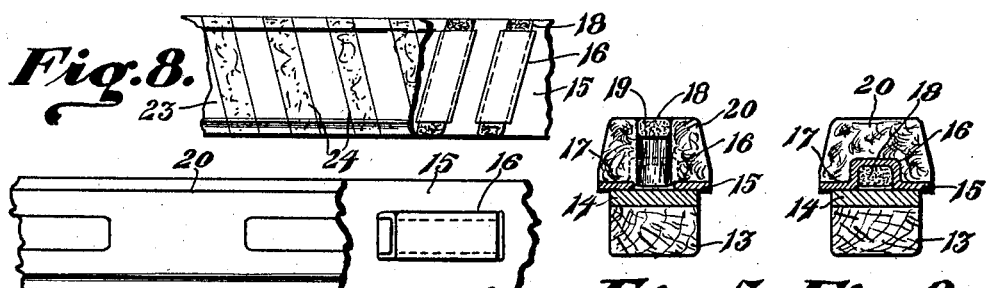
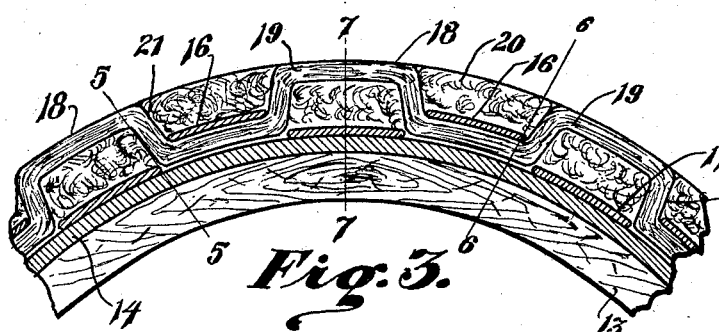
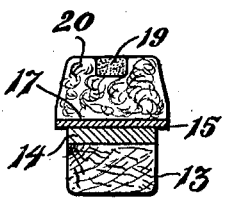
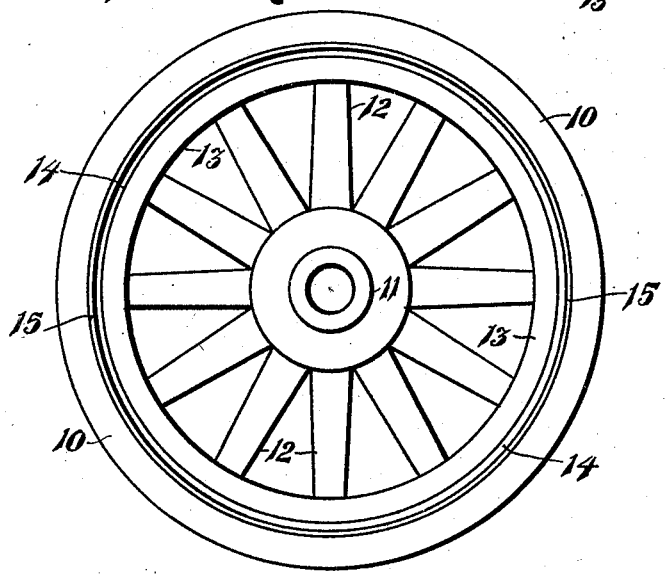
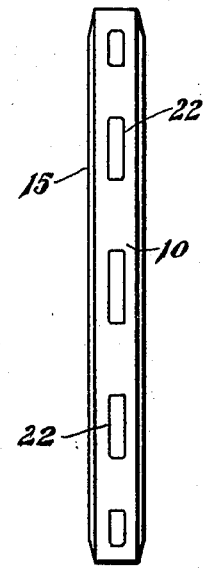
CHARLES P. SALGEE
INVENTOR
ATTORNEY

UNITED STATES PATENT OFFICE.

CHARLES P. SALGEE, OF PHILADELPHIA, PENNSYLVANIA.

ANTISKID-TIRE.

1,385,926.   Specification of Letters Patent.   Patented July 26, 1921.

Application filed December 11, 1920. Serial No. 429,969.

*To all whom it may concern:*

Be it known that I, CHARLES P. SALGEE, a citizen of the United States, residing at Philadelphia, in the county of Philadelphia and State of Pennsylvania, have invented new and useful Improvements in Antiskid-Tires, of which the following is a specification.

This invention relates to tires and more particularly to resilient tires, that is to say tires in which the tread portion is made more or less wholly from rubber, such tires being more generally employed on heavy motor vehicles and trucks. In many instances tires of the kind referred to are double faced or centrally grooved in order to insure a better grip on the surface over which said tire travels, but I have found that such a partition of the tire does not prevent skidding or side-slips, and the main object of my present invention is to provide a novel structure of resilient or solid tire in which there is embedded material having a high co-efficient of friction, said embedded material being so disposed and arranged relative to the associated rubber as in no wise to impair the resiliency.

Another object of this invention is to provide an anti-skid tire in which rubber and another material of less resiliency are so incorporated as to produce a more serviceable and durable tire than has hitherto been possible.

A further object of this invention is to provide an anti-skid tire which is so bonded to the tire rim that its lateral displacement relative thereto is rendered impossible.

With the foregoing and other objects in view as will later on be more apparent my invention consists essentially in providing a resilient tire having a continuous length of material having a high co-efficient of friction embedded therein, and in anchoring said length of material to the tire rim.

In the further disclosure of the invention reference is to be had to the accompanying sheet of explanatory drawing, constituting a part of this specification, and in which like characters of reference designate the same or similar parts in all the views.

Figure 1—is a side view of a wheel having my improved anti-skid tire applied thereto, and as adapted for use on heavy motor vehicles.

Fig. 2—is an edge view of the same.

Fig. 3—is an enlarged fragmentary section through the wheel felly and tire.

Fig. 4—is a fragmentary plan of the same with a portion of the tire removed in order to better illustrate the face of the tire rim.

Fig. 5—is a transverse section on the line 5—5 in Fig. 3.

Fig. 6—is a transverse section on the line 6—6 in Fig. 3.

Fig. 7—is a transverse section on the line 7—7 in Fig. 3; and

Fig. 8—is a broken fragmentary plan of a modified form of my invention.

Referring more particularly to the views the numeral 10 designates a truck-wheel which includes a hub 11, spokes 12, a felly 13, and a felly band or rim 14, all of said parts being constructed and assembled in the well known ways and forming no part of my invention.

Now, according to my invention I first of all make what may conveniently be termed the tire-rim 15 of appropriate metal and which is readily adapted to be shrunk or otherwise secured on to the felly band 14 in any of the known ways. This tire-rim 15 is fashioned according to the form of my invention shown with a series of outward and radially projecting centrally disposed bridge-pieces 16 which are stamped or otherwise formed therein, said bridge-pieces it being particularly noted providing substantially channel shaped passages at regular intervals entirely around the outer peripheral surface 17 of the tire rim.

Threaded or laced through the bridge-pieces 16 is a continuous length 18 of rope-like nature preferably formed of woven cotton thread or the like, said length 18 being drawn out between consecutive bridge-pieces 16 to constitute loops 19 for the purpose hereafter explained. It is here to be noted that this rope-like length 18 is made of material having a high co-efficient of friction coupled with a reasonable degree of resiliency which may be attained by weaving cotton threads into a fabric of appropriate texture and then subjecting the fabric as formed to pressure of the required density whereby a rope or cord of the pattern and cross-section illustrated is produced. Or said rope-like length 18 may be of a braided, twisted or plaited nature as will be obvious, and the free ends when brought together are spliced or connected in such manner as to insure continuity in said rope-like length 18.

The tire proper or tread 20 of rubber or other suitable resilient material may be now molded on the combined tire rim 15 and rope-like length 18 whereby the completed tire is produced; or, preferably the tread 20 is first of all produced by molding with the requisite zig-zag passages 21, Fig. 3, therein, whereupon it is expanded on to the rim 15 and the rope-like length 18 finally laced through said passages 21 and bridge-pieces 16 as will be obvious to those skilled in the art to which this invention appertains, the free ends of said rope-like length being drawn tightly together and appropriately spliced. Thus it will be seen that the rubber tread 20 is securely anchored to the tire rim 15 and can not be laterally displaced or creep relative to said rim. Furthermore it is to be noted that a resilient tire constructed as above set forth presents on its tread surface a series of equally spaced fabric insets 22—Figs. 2 and 4—which are completely surrounded with the more resilient rubber, and that due to said fabric having a higher co-efficient of friction than the rubber a tire is produced which will not skid on slippery or wet surfaces.

In the slightly modified form of the invention shown in Fig. 8, it is to be noted that the tire rim 15 is fashioned with the bridge-pieces 16 angularly disposed relative thereto, so that the rope-like length of fabric 18 is wound about the tire proper 20 spirally whereby a fluted tread surface is produced with obliquely alternating rubber and fabric surfaces 23, 24, respectively, it being of course well understood that the rubber tire 20 is accordingly molded so that the threading of the rope-like length 18 may be easily accomplished to produce a tire of this particular type.

From the foregoing description and an examination of the drawings it will be readily seen that by interlacing the rope-like length of fabric 18 in the rubber tire 20 as set forth and compressing same there is produced an integral tire structure having inset portions 22 so to speak which present surfaces to the roadway having a higher co-efficient of friction than that of the rubber body 20 whereby side slippage or "skidding" is effectively prevented. It will also be clearly apparent that by combining the rubber and compressed fabric in the manner and fashions disclosed I provide a resilient tire which is more durable and which will appreciably improve the tractive quality thereof. Still further by arranging the fabric 18 relative to the rubber 20 as shown an anti-skid tread is produced.

Another feature of improvement worthy of comment is the fact that by anchoring the tire 20 to the tire rim 15 as set forth, said tire rim 15 can be made much lighter in weight in that side flanges are not needed for preventing lateral displacement of the rubber tire relative thereto.

Obviously a resilient tire constructed and arranged as above outlined may be shrunk on or otherwise attached to the felly band 14 in any of the well known ways, and while I have shown and described the application of my invention to a single tread wheel, it will be self-evident that it is equally applicable to wheel tires having two road faces or treads separated by an intervening groove.

Finally while I have described and shown practical embodiments of my invention it is to be clearly understood that changes in the shape, pattern and details of construction may be readily evolved without departing from the spirit and scope thereof as more specifically defined by the appended claims.

Having described my invention what I claim as new and desire to secure by Letters Patent, is:—

1. A tire for vehicle wheels comprising an annular ring adapted for attachment on a wheel felly and having longitudinally disposed bridge pieces struck outwardly therefrom, a resilient tire for fitment on said annular ring and having a staggered continuous passage therethrough, and a rope-like element of a higher co-efficient of friction threaded through said continuous passage and bridge pieces whereby said parts are firmly anchored together.

2. A tire for vehicle wheels comprising an annular flat ring adapted for attachment on a wheel felly and having equi-distant longitudinally disposed integral bridge pieces projecting outwardly therefrom, a rubber tire for fitment on said annular ring over the bridge pieces and having an undulating continuous passage therethrough, and a compressed fabric rope-like element of a higher co-efficient of friction continuously interlaced through said passage and bridge pieces whereby the tire is firmly anchored to the flat ring.

In testimony whereof I affix my signature.

CHARLES P. SALGEE.